United States Patent
Ghosh et al.

(10) Patent No.: US 10,271,263 B2
(45) Date of Patent: Apr. 23, 2019

(54) SYSTEMS AND METHODS FOR FRAME ADDRESSING IN WIRELESS NETWORKS

(71) Applicant: Intel IP Corporation, Santa Clara, CA (US)

(72) Inventors: Chittabrata Ghosh, Fremont, CA (US); Carlos Cordeiro, Portland, OR (US); Laurent Cariou, Portland, OR (US)

(73) Assignee: Intell IP Corporation, Santa Clara, CA (US)

( * ) Notice: Subject to any disclaimer, the term of this patent is extended or adjusted under 35 U.S.C. 154(b) by 186 days.

(21) Appl. No.: 14/998,213

(22) Filed: Dec. 26, 2015

(65) Prior Publication Data
US 2017/0070943 A1 Mar. 9, 2017

Related U.S. Application Data

(60) Provisional application No. 62/214,757, filed on Sep. 4, 2015.

(51) Int. Cl.
*H04W 40/32* (2009.01)
*H04B 7/0452* (2017.01)
*H04L 29/12* (2006.01)

(52) U.S. Cl.
CPC .......... *H04W 40/32* (2013.01); *H04B 7/0452* (2013.01); *H04L 61/2069* (2013.01); *H04L 61/6022* (2013.01)

(58) Field of Classification Search
CPC ... H04W 40/32; H04B 7/0452; H04L 61/6022
See application file for complete search history.

(56) References Cited

U.S. PATENT DOCUMENTS

| 9,515,925 | B2 * | 12/2016 | Wentink | H04L 29/0604 |
| 2011/0317630 | A1 * | 12/2011 | Zhu | H04W 74/0816 370/329 |
| 2012/0087358 | A1 * | 4/2012 | Zhu | H04W 74/0816 370/338 |
| 2013/0128809 | A1 * | 5/2013 | Wentink | H04L 29/0604 370/328 |
| 2013/0336251 | A1 * | 12/2013 | Park | H04W 74/0816 370/329 |

(Continued)

*Primary Examiner* — Andrew W Chriss
*Assistant Examiner* — Voster Preval
(74) *Attorney, Agent, or Firm* — Eversheds Sutherland (US) LLP

(57) ABSTRACT

Systems and methods for frame addressing in DL MU-MIMO transmissions are described. In some embodiments, identifier information identifying receiving devices for a frame may be included in a header of that frame. In various embodiments, the identifier information may include a concatenation of respective identifiers for each of the plurality of receiving devices. In some other embodiments, the identifiers may include information identifying a pre-defined device group including several receiving devices. In some embodiments, the frame may include a medium access control (MAC) frame transmitted by an access point/personal basic service set control point (PCP/AP), and the recipient devices may include non-AP/non-PCP stations (STAs). In some such embodiments, a receiving STA address (RA) field or transmitting STA address (TA) field in a MAC header of the MAC frame may be used as a container for the recipient identifier information.

20 Claims, 8 Drawing Sheets

(56) References Cited

U.S. PATENT DOCUMENTS

| | | | | |
|---|---|---|---|---|
| 2015/0016558 A1* | 1/2015 | Choi | ................... | H04B 7/0452 |
| | | | | 375/267 |
| 2015/0271137 A1* | 9/2015 | Seok | ...................... | H04W 4/70 |
| | | | | 370/338 |
| 2015/0289164 A1* | 10/2015 | Seok | ...................... | H04W 4/70 |
| | | | | 370/311 |
| 2016/0242195 A1* | 8/2016 | Kwon | ................. | H04W 72/121 |
| 2016/0337783 A1* | 11/2016 | Seok | ........................ | H04L 1/16 |
| 2016/0344531 A1* | 11/2016 | Li | ........................ | H04L 5/0037 |
| 2016/0381702 A1* | 12/2016 | Jeong | ................. | H04W 74/006 |
| | | | | 370/329 |

\* cited by examiner

SYSTEMS AND METHODS FOR FRAME ADDRESSING IN WIRELESS NETWORKS

CROSS-REFERENCE TO RELATED APPLICATIONS

This application claims the benefit of U.S. Provisional Application No. 62/214,757, filed Sep. 4, 2015.

TECHNICAL FIELD

This disclosure generally relates to systems and methods for wireless communications and, more particularly, wireless communications between devices in wireless networks.

BACKGROUND

Wireless devices are becoming prevalent and are increasingly making use of various wireless channels. The 60 GHz wireless communication frequency band is promising for use with the high data-rate demands of wireless communications devices.

With respect to wireless networks that use the 60 GHz band, wireless devices with downlink (DL) multi-user multiple-input multiple-output (MU-MIMO) capabilities are desirable. Using DL MU-MIMO techniques, transmitting devices may put available wireless channel resources to more efficient use.

BRIEF DESCRIPTION OF THE DRAWINGS

The accompanying drawings form an integral part of the disclosure and are incorporated into the present specification. The drawings illustrate example embodiments of the disclosure and, in conjunction with the description and claims, serve to explain at least in part various principles, features, or aspects of the disclosure. Certain embodiments of the disclosure are described more fully below with reference to the accompanying drawings. However, various aspects of the disclosure can be implemented in many different forms and should not be construed as limited to the implementations set forth herein. Like numbers refer to like elements throughout.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Various embodiments may be generally directed to frame addressing techniques for down-link (DL) Multi-user MIMO (MU-MIMO) transmissions. In some embodiments, identification information (also referred to as identifiers and/or identifier information herein) identifying receiving device(s) (e.g. wireless devices, cell phones, laptops, stations (STAs), and the like) for a data frame (also referred to as frame herein) may be included in a header of that frame. In various embodiments, the identifiers may include a concatenation of respective identifiers for each of the receiving device(s). In some other embodiments, the identifiers may include information identifying a pre-defined device group including the receiving devices. In various embodiments, the frame may include a medium access control (MAC) frame transmitted by an access point/personal basic service set control point (PCP/AP), and the receiving devices may include non-AP/non-PCP stations STAs. In some such embodiments, a receiving STA address (RA) field or transmitting STA address (TA) field in a MAC header of the MAC frame may be used as a container for the identifiers.

Figure 1:
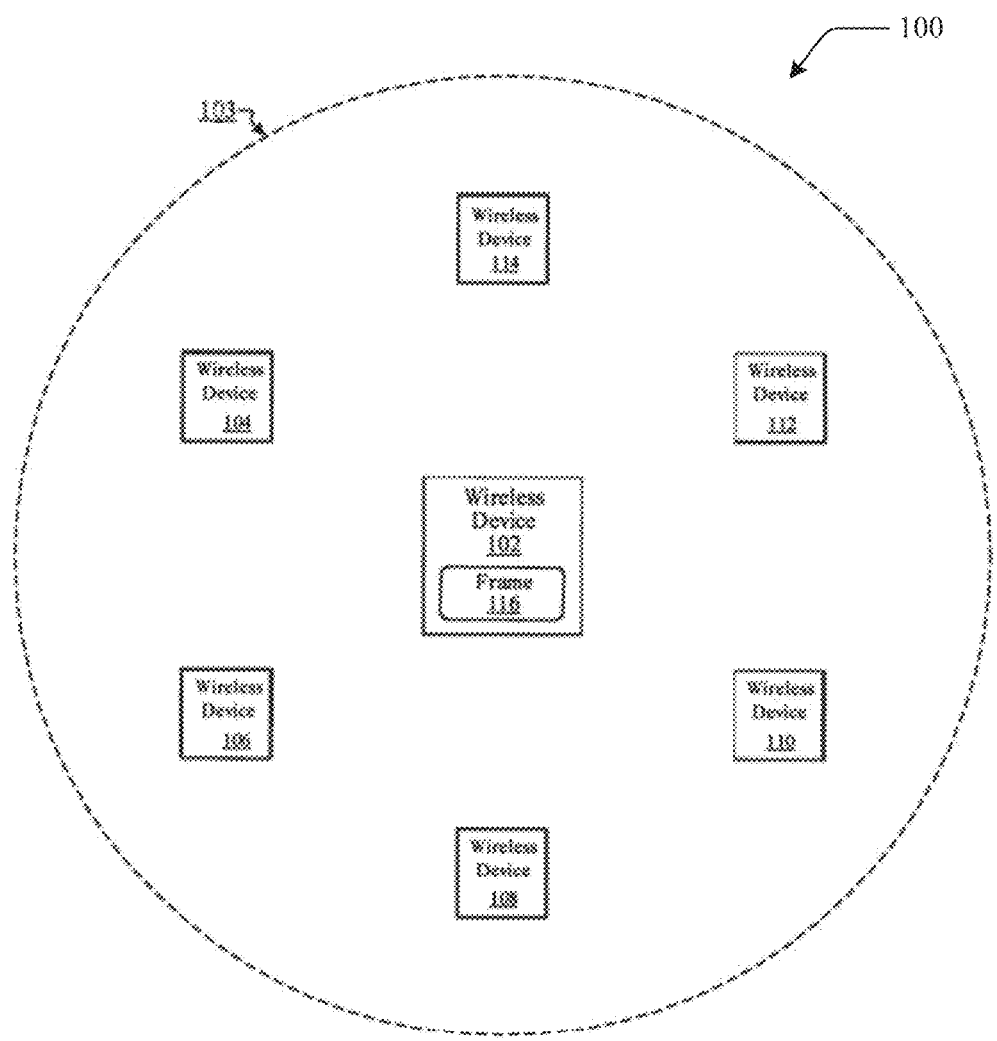
FIG. 1 depicts a network diagram illustrating an example network environment, according to one or more example embodiments of the disclosure.

FIG. 1 shows a network diagram illustrating an example operating network environment 100, according to various embodiments of the present disclosure. Wireless network 103 may include one or more wireless devices 104-114 (herein also referred to as devices and/or receiving devices) and at least one wireless device 102 (herein also referred to as PCP/AP, wireless device, and/or merely device), which may communicate in accordance with IEEE 802.11 communication standards, including IEEE 802.11ax. The device(s) 104-114 may be mobile devices that are non-stationary and do not have fixed locations.

With continued reference to FIG. 1, it may be desirable that wireless device 102 implement DL MU-MIMO techniques, for example, to put available wireless channel resources of wireless network 103 to more efficient use. In the context of operating environment 100, the implementation of DL MU-MIMO techniques by wireless device 102 may involve using a same frame 116 to concurrently transmit information/data (e.g. PLCP Protocol Data Units (PPDUs)) to multiple receiving devices, such as two or more of wireless devices (e.g., devices 104-114). In various embodiments, this may require that wireless device 102 be equipped with a mechanism via which it can specify the multiple receiving devices of the frame 116. However, according to conventional techniques, no such mechanism may exist. For example, the IEEE 802.11ad-2012 standard does not allow for DL MU-MIMO operation, and does not provide a way for a PCP/AP to indicate multiple receiving STAs for a DL frame. Hence, in some embodiments, the wireless device 102 may operate as a PCP/AP, and may perform various operations in order to manage wireless channel resources/access in wireless network 103, which may include a 60 GHz WLAN. In some such embodiments, wireless devices 104-112 may operate as non-AP/non-PCP STAs, and may associate with wireless device 102 in order to establish wireless data connectivity via wireless network 103.

In some embodiments, the wireless devices 104-112 and/or the wireless device 102 operating as a PCP/AP may include one or more computer systems similar to that of the functional diagram of FIG. 6 and/or the example machine/system of FIG. 7, discussed later in this disclosure.

Figure 2:
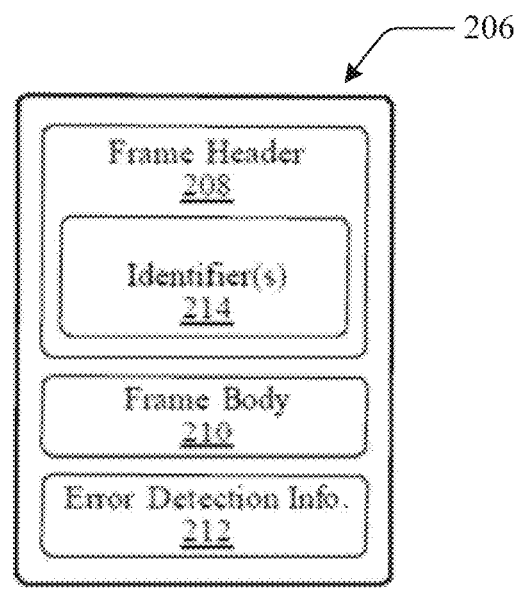
FIG. 2 illustrates an embodiment of a frame, according to one or more example embodiments of the disclosure.

FIG. 2 illustrates an example of a composition of a representative frame 206 in accordance with the disclosed frame addressing techniques for DL MU-MIMO transmissions. As shown in FIG. 2, frame 206 may include a frame header 208, a frame body 210, and error detection information 212. The frame header 208 may include information that devices receiving frame 206 may require in order to determine whether/how to decode/process frame 206. Frame body 210 may include data/information intended for multiple receiving devices. In various embodiments, error detection information 212 may include information, such as a cyclic redundancy check (CRC) value that can be used by any given receiving device to determine whether it has correctly received frame 206.

Moreover, the receiving identifier(s) 214 may be included in frame header 208 to identify receiving device(s) for frame 206. The receiving identifiers may include a concatenation of respective identifiers for each of the receiving device(s). The receiving identifiers may include information identifying a pre-defined device group including the receiving devices. For example, the frame header 208 can include a MAC header (such as the example MAC header 302 depicted in FIG. 3, to be discussed below). In some embodiments, an RA field within frame header 208 may be used as a container for receiving device identifier information 214 that includes a concatenation of respective identification information for each of the receiving devices, e.g. STAs.

Figure 3:
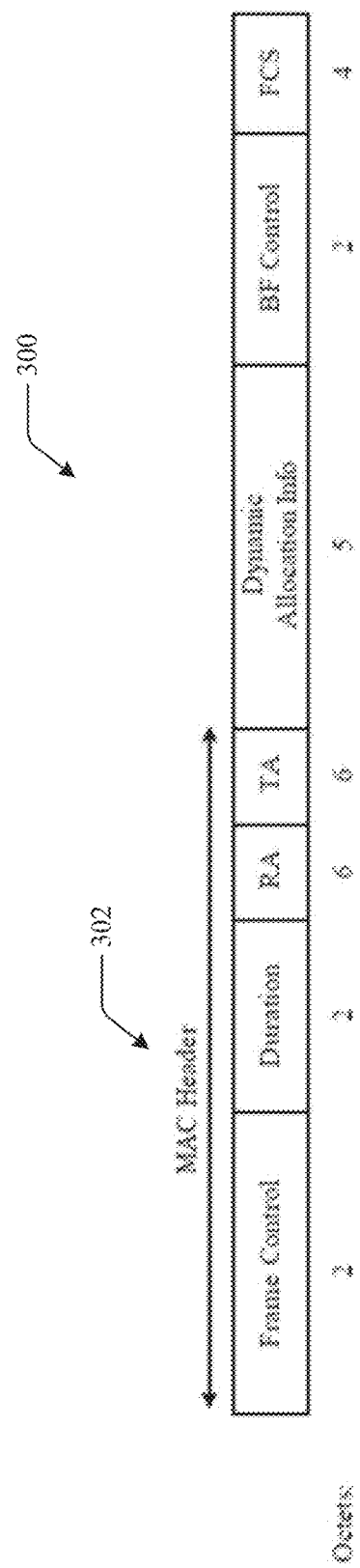
FIG. 3 illustrates an embodiment of a frame format, according to one or more example embodiments of the disclosure.

FIG. 3 illustrates an example frame format 300 and MAC header 302 that may, for example, be representative of frame 206 and frame header 208 of FIG. 2, respectively. As shown in FIG. 3, frame format 300 can include a plurality of fields, including a Frame Control field (e.g., 2 octets), a Duration field (e.g., 2 octets), an RA field of (e.g., 6 octets), a TA field (e.g., 6 octets), a Dynamic Allocation Info field of (e.g., 5 octets), a BF Control field (e.g., 2 octets), and an FCS field (e.g., 4 octets). The Frame Control, Duration, RA, and TA fields can be included in the MAC header 302 portion of frame format 300. The set of fields depicted in this example correspond to the fields of a Grant frame as defined in IEEE 802.11ad-2012. However, it is to be appreciated that the use of this example is not to be interpreted as limiting the scope of the embodiments. The fields included in frame header format 300 and/or MAC header 302 may differ from those shown in FIG. 3, and the contemplated techniques may be implemented in conjunction with transmission of any type of management frame, control frame, action frame, and/or data frame.

Figure 4:
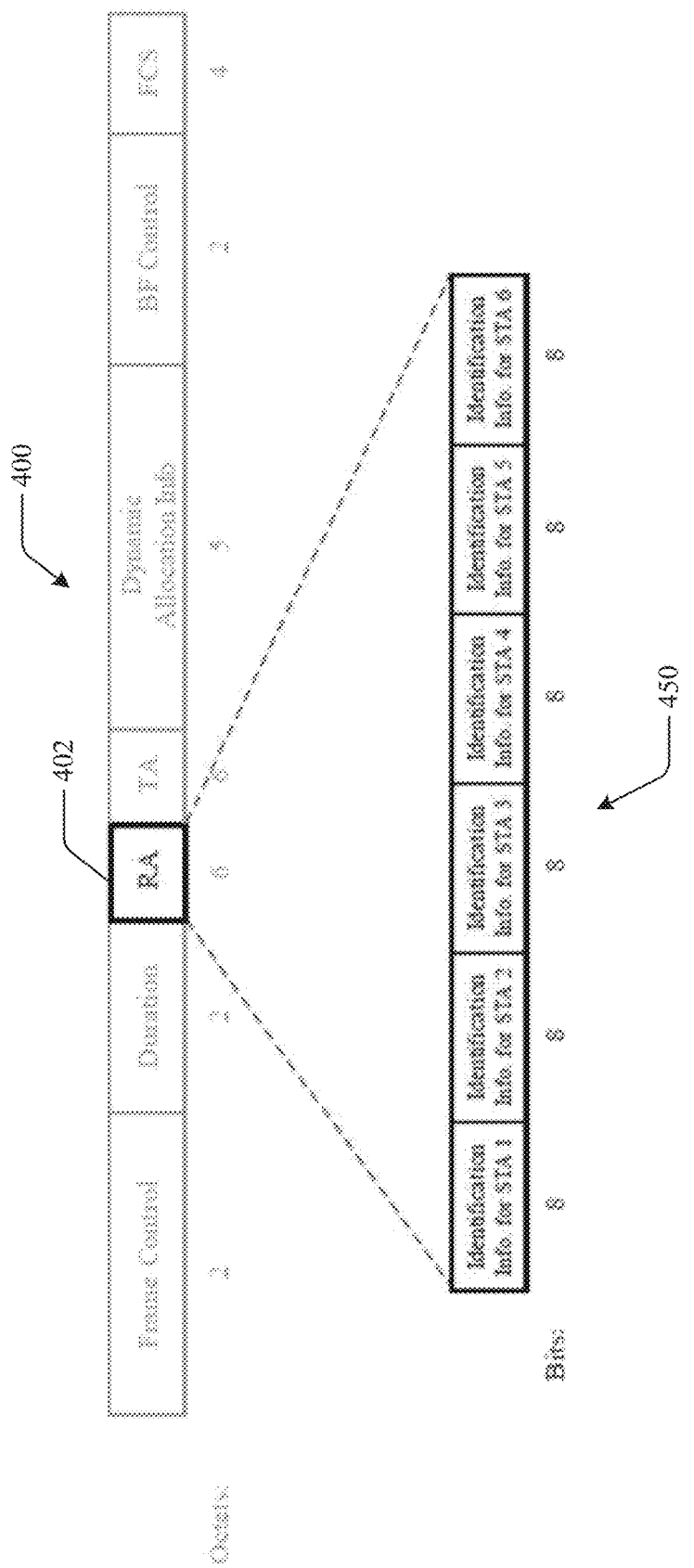
FIG. 4 illustrates an embodiment of a field format, according to one or more example embodiments of the disclosure.

FIG. 4 illustrates an example field format 450 of the frame format 400 that may be representative of a format of an RA field 402, for example, within frame header 208 of FIG. 2 and/or MAC header 302 of FIG. 3. As shown in FIG. 4, field format 450 can include a concatenation of respective identifiers for each device, of which there are six (6) in the illustrated embodiment. In this example, the respective identifier information for each device (e.g. STA) can be 8 bits (e.g., a byte). As such, the concatenated identifier information includes 48 bits (6 bytes), matching the defined size of the RA field according to frame format 400.

In various embodiments, each such portion of the identifier information may include an association identifier (AID) for a respective STA. For example, with reference to operating environment 100 of FIG. 1, the field format 450 may include a concatenation of the respective AIDs of each of wireless devices 104-112. Each portion of identifiers in the field format 450 may include information derived using a hash function or other function. For example, once again in reference to operating environment 100 of FIG. 1, each portion of identifier information in the field format 450 may include the 8 least-significant bits (LSBs) of the MAC address of a respective one of wireless devices 104-112. Moreover, the RA field may be used to convey identifiers for fewer devices than the maximum number that it can accommodate. For example, if the field format 450 can be used to convey identification information for up to 6 devices, the RA field may be used to convey identification information for only 3 devices. In various such embodiments, the unused bits/octets of the RA field may be set to a null value (e.g. "0") or ignored. Alternatively, in some embodiments (e.g. in embodiments in which the device is communicating with legacy device(s)), the TA field may be used to convey identifiers for fewer devices than the maximum number that it can accommodate. For example, if the field format 450 can be used to convey identification information for up to 6 devices, the TA field may be used to convey identification information for only 3 devices. In various such embodiments, the unused bits/octets of the TA field may be set to a null value (e.g. "0") or ignored.

Returning to FIG. 2, in some embodiments, rather than comprising a concatenation of respective identifiers for a receiving device(s), the receiving identifiers 214 of FIG. 2 may include information identifying a pre-defined device group of receiving devices. For example, the identifiers 214 may include a group identifier (i.e. a group ID) for a pre-defined group of STAs. Alternatively, rather than featuring field format 450, the RA field 402 may simply contain the group ID. For example, a first octet of the RA field may include a group ID for a STA group of receiving STAs, and the remaining octets may be set to a null value (e.g. "0") or ignored. Alternatively, in some embodiments (e.g. in embodiments in which the device is communicating with legacy device(s)), rather than featuring field format 450, the TA field may simply contain the group ID. For example, a first octet of the TA field may include a group ID for a STA group of receiving STAs, and the remaining octets may be set to a null value (e.g. "0") or ignored.

Again returning to FIG. 2, the wireless devices' frame 206 may access the identifiers 214 in the frame header 208 and determine whether the identifiers 214 identifies them as intended recipients of the frame 206. For example, a given device may determine that it is an intended recipient of the frame 206 if its AID is included in an RA field (or alternatively in a TA field in some embodiments, e.g., in embodiments in which the device is communicating with legacy device(s)) of frame header 208; if not, it may determine that it is not an intended recipient of frame 206. In another example, a given device may determine that it is an intended recipient of frame 206 if it is a member of a device group identified by a group ID or other device group identifier included in an RA field (or alternatively in a TA field in some embodiments, e.g. in embodiments in which the device is communicating with legacy device(s)) of frame header 208; if not, it may determine that it is not an intended recipient of frame 206.

In an embodiment, the order in which the receiving devices are identified in identifiers 214—or the ordering of the receiving devices according to a definition of a device group identified by identifiers 214—may define the order in which the receiving devices are to respond to frame 206. For example, with reference to field format 450 of FIG. 4, a first device (e.g. STA 1) may respond first since its identifier appears first, a second device, (e.g. STA 2) may respond second, and so forth.

In another aspect, it can be possible that populating the RA field in frame format 400 with concatenated identifiers or device group identifiers may yield an RA field that happens to match the actual MAC address of a legacy device (e.g. an STA that receives frame 206). Such a legacy device may erroneously conclude that it is an intended recipient of frame 206 and attempt to decode it, which may result in unnecessary/undesirable power consumption at that legacy device. Thus, the TA field may be used as a container for identifiers 214 instead of the RA field. For example, the TA address is placed in the RA field and the RA address is placed in the TA field. The contents of the RA and TA fields may be inverted, such that the RA field identifiers for the device transmitting frame 206, and the TA field contains identifiers for the intended recipients of frame 206. This may enable legacy devices to correctly determine that they are not intended recipients of frame 206 while still allowing the specification of multiple MU-MIMO capable devices as intended recipients of frame 206.

Figure 5A:
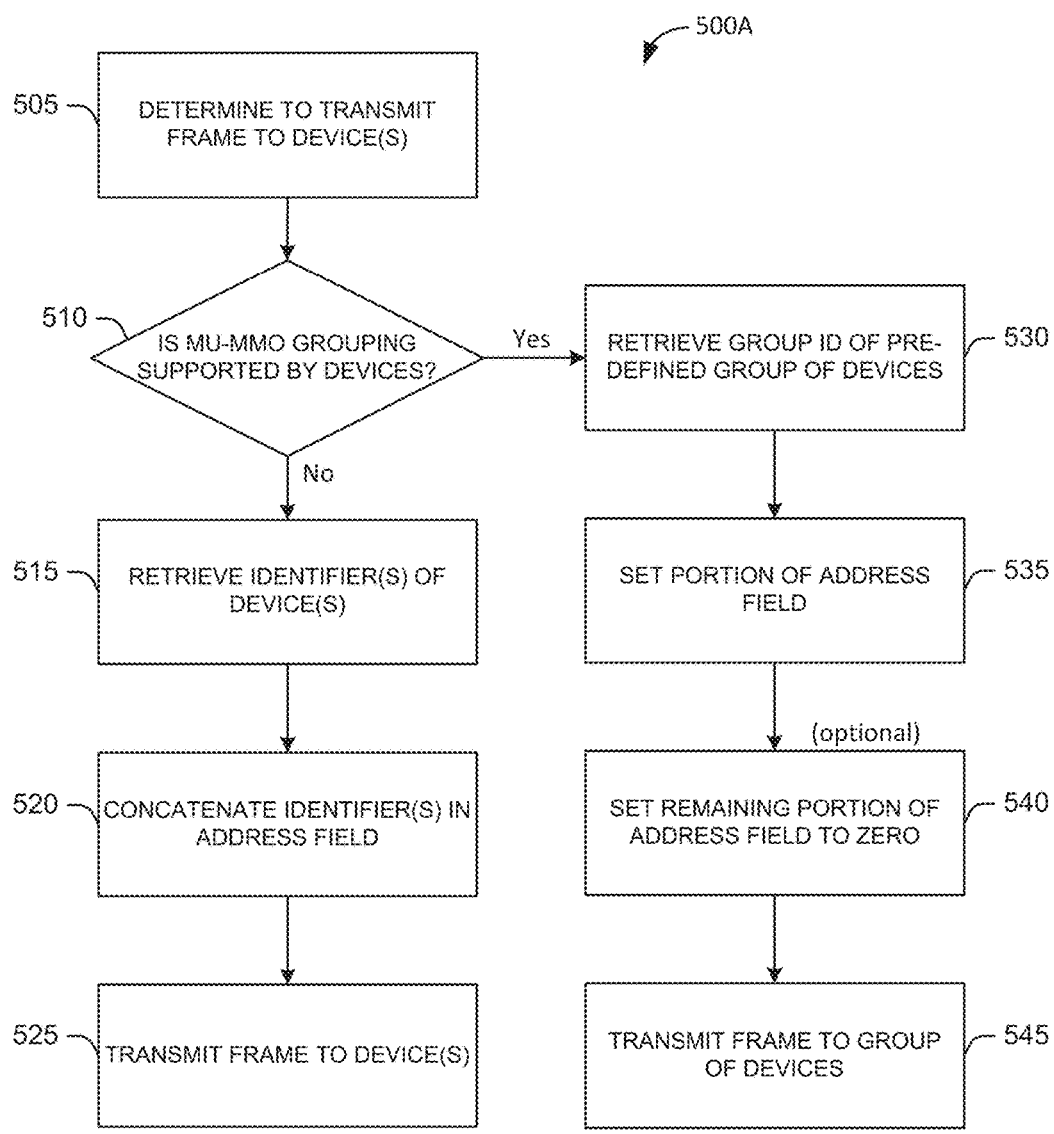
FIGS. 5A and 5B illustrate an example flow chart detailing aspects of the operation of the disclosed systems and methods, in accordance with one or more example embodiments of the disclosure.

FIG. 5A shows an example flowchart 500A in accordance with the disclosure. In block 505, a device (for example, the AP 102 of FIG. 1) determines to transmit one or more data frames to one or more receiving devices (e.g. the devices 104-114 of FIG. 1). In block 510, the device then determines whether MU-MIMO grouping is supported by the receiving device(s). This can be done for example, by checking internal memory blocks associated with the device and/or the receiving device, and/or by monitoring network data associated with the receiving device(s) and/or communicating with the receiving device(s). Alternatively, or in combination, the device can send a frame to inquire from the receiving device(s) whether the MU-MIMO grouping is supported or not. If MU-MIMO grouping is not supported, then the device can retrieve one or more identifiers associated with the receiving devices, as shown in block 515. In some embodiments, only one receiving device out of the plurality of possible receiving devices may not support MU-MIMO grouping. In this case, the determination can still be that the entire group of devices does not support MU-MIMO grouping. The identifiers can be, for example, AID(s) of the receiving devices, a hash of the receiving device(s) network identifier(s) (e.g. 8 LSB's of their MAC address of the receiving device(s)), and the like. The device can then (at block 520) concatenate (or alternatively join, and/or couple, and/or connect, and/or integrate, and/or link together, for example, in memory) the identifier(s) in an address field of the data frame(s), for example as shown in FIGS. 3 and 4 and described in related discussion. In some embodiments the address field of the data frame(s) can include the RA field. In other embodiments, such as those involving legacy receiving devices, the address field of the data frame(s) can include a TA field acting as the RA frame, for compatibility. Finally, in block 525, the device can transmit the data frame(s) with the concatenated identifier(s) to the receiving devices.

Alternatively, if the determination in block 510 is that MU-MIMO grouping is supported by the receiving devices (510), then the device can retrieve a group ID associated with the pre-defined group of devices (530). The retrieval of the group ID can be done, for example, in connection with a group ID that was determined previously in association with beamforming. Alternatively, or in combination, the retrieval can be performed by checking internal memory blocks associated with the device and/or the receiving device, and/or by monitoring network data associated with the receiving device(s) and/or communicating with the receiving device(s). The device can then set the address field of the data frame to the group ID (block 535). For example, the device can then set one or more octets of the address field of the data frame to the group ID. In some embodiments, the address field of the data frame(s) can include the RA field. In other embodiments, such as those involving legacy receiving devices, the address field of the data frame(s) can include a TA field acting as the RA frame, for compatibility. In some embodiments, the address field may be set to a hashed version of the group ID. This may be done, for example, if the address field is organized in units of multiple octets, or in units other than octets (e.g. quartets, hextets, and the like). The device can then, as shown in block 540, optionally set the remaining entries of the address field of the frame to a null value, e.g. to "0". In some embodiments the remaining entries may be organized in octets, in which case those octets can be set to a null value, e.g. to "0". In 545, the device can transmit the data frame with the group ID to a group of receiving devices.

Figure 5B:
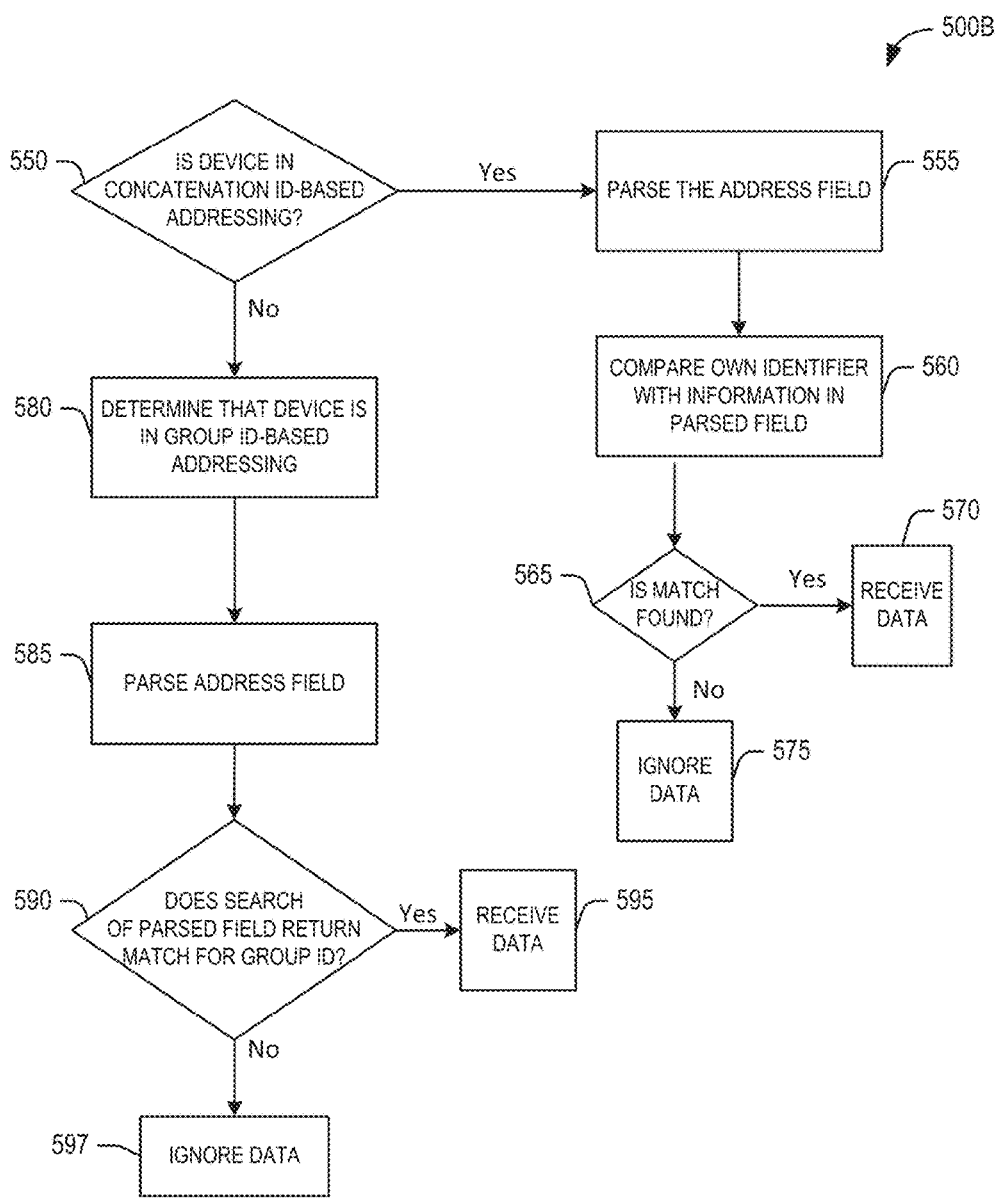

FIG. 5B shows an example flowchart 500B in accordance with the disclosure. In 500B, a receiving device (e.g. any of the devices 104-114 of FIG. 1) that receives a frame in accordance with the disclosure (e.g., frame 206), determines to receive data in data frame(s) from a device (e.g. the AP 102 of FIG. 1). In block 550, the receiving device determines whether it is interacting in a concatenation ID-based addressing mode. If so, then the receiving device parses the data in the address field of the data frame(s), in block 555. For example, if the data is in the form of several 8-bit bytes (i.e. octets), the device can parse out individual 8-bit bytes. The receiving device can then, in 560, compare the receiving device's own identifier (e.g. the AID of the receiving device, a hash of the receiving device network identifier (e.g. 8 LSBs of the MAC address of the receiving device), and/or the like) to the parsed data (e.g. each octet in the parsed data in the address field). In block 565, the receiving device can determine whether or not a match is found between its own identifier and the parsed data. If a match is found, then the receiving device can receive the data frame(s) (block 570). If a match is not found, then the receiving device can ignore any data in the data frame(s) (block 575).

Alternatively, if the receiving device determines that it is not interacting in a concatenation ID-based addressing mode. The device can then determine (block 580) that it is in a group-ID based addressing mode. This can be done for example, by checking internal memory blocks associated with the device and/or the receiving device, and/or by monitoring network data associated with the receiving device(s) and/or communicating with the receiving device(s). Alternatively, or in combination, the device can send a frame to inquire from the receiving device(s) whether said device(s) operate in a group-ID based addressing mode. The receiving device can then parse the data in the address field of the data frame(s), in block 585. For example, if the data is in the form of several 8-bit bytes (i.e. octets), the device can parse out individual 8-bit bytes. The receiving device can then, in block 590, search the receiving device's group identifier to the parsed data (e.g. each octet in the parsed data in the address field). In some embodiments, the parsed data of interest (e.g. the octet of interest) may only be the first few bits (e.g. the first octet) of address field. If the search by the receiving device results in a match between its group identifier and the parsed data, then the receiving device can receive the data frame(s) (block 595). If a match is not found, then the receiving device can ignore any data in the data frame(s) (block 597).

Figure 6:
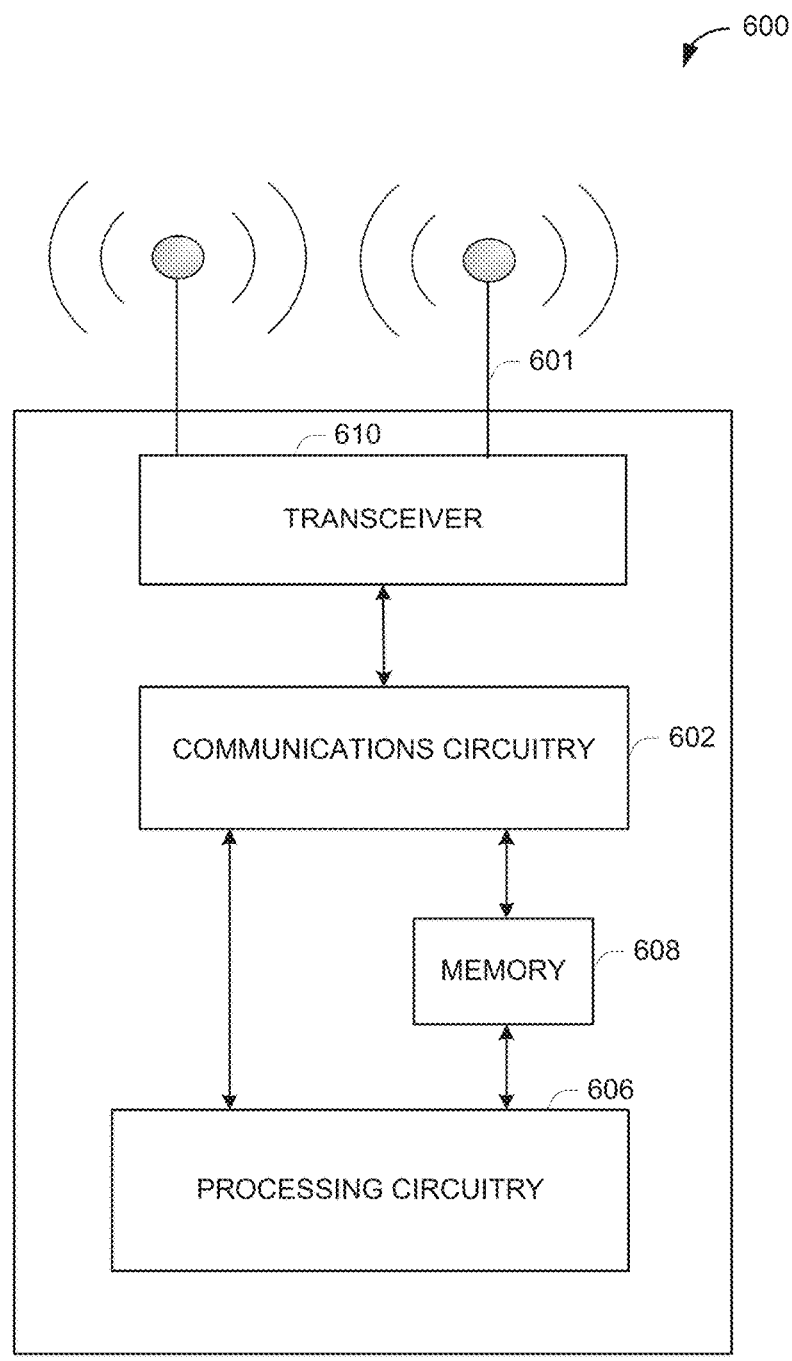
FIG. 6 illustrates a functional diagram of an example communication station that may be suitable for use as a user device, in accordance with one or more example embodiments of the disclosure.

FIG. 6 shows a functional diagram of an exemplary communication station 600 in accordance with some embodiments. In one embodiment, FIG. 6 illustrates a functional block diagram of a communication station that may be suitable for use as an AP 102 (FIG. 1) or receiving devices 104-114 (FIG. 1) in accordance with some embodiments. The communication station 600 may also be suitable for use as a handheld device, mobile device, cellular telephone, smartphone, tablet, netbook, wireless terminal, laptop computer, wearable computer device, femtocell, High Data Rate (HDR) subscriber station, access point, access terminal, or other personal communication system (PCS) device.

The communication station 600 may include communications circuitry 602 and a transceiver 610 for transmitting and receiving signals to and from other communication stations using one or more antennas 601. The communications circuitry 602 may include circuitry that can operate the physical layer communications and/or medium access control (MAC) communications for controlling access to the wireless medium, and/or any other communications layers for transmitting and receiving signals. The communication station 600 may also include processing circuitry 606 and memory 608 arranged to perform the operations described herein. In some embodiments, the communications circuitry 602 and the processing circuitry 606 may be configured to perform operations detailed in FIGS. 5A and 5B.

In accordance with some embodiments, the communications circuitry 602 may be arranged to contend for a wireless medium and configure frames or packets for communicating over the wireless medium. The communications circuitry 602 may be arranged to transmit and receive signals. The communications circuitry 602 may also include circuitry for modulation/demodulation, upconversion/downconversion, filtering, amplification, etc. In some embodiments, the processing circuitry 606 of the communication station 600 may include one or more processors. In other embodiments, two or more antennas 601 may be coupled to the communications circuitry 602 arranged for sending and receiving signals. The memory 608 may store information for configuring the processing circuitry 606 to perform operations for configuring and transmitting message frames and performing the various operations described herein. The memory 608 may include any type of memory, including non-transitory memory, for storing information in a form readable by a machine (e.g., a computer). For example, the memory 608 may include a computer-readable storage device may, read-only memory (ROM), random-access memory (RAM), magnetic disk storage media, optical storage media, flash-memory devices and other storage devices and media.

In some embodiments, the communication station 600 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 600 may include one or more antennas 601. The antennas 601 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 600 may include one or more of a keyboard, a display, a non-volatile memory port, multiple antennas, a graphics processor, an application processor, speakers, and other mobile device elements. The display may be an LCD screen including a touch screen.

Although the communication station 600 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 600 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 600 may include one or more processors and may be configured with instructions stored on a computer-readable storage device memory.

Figure 7:
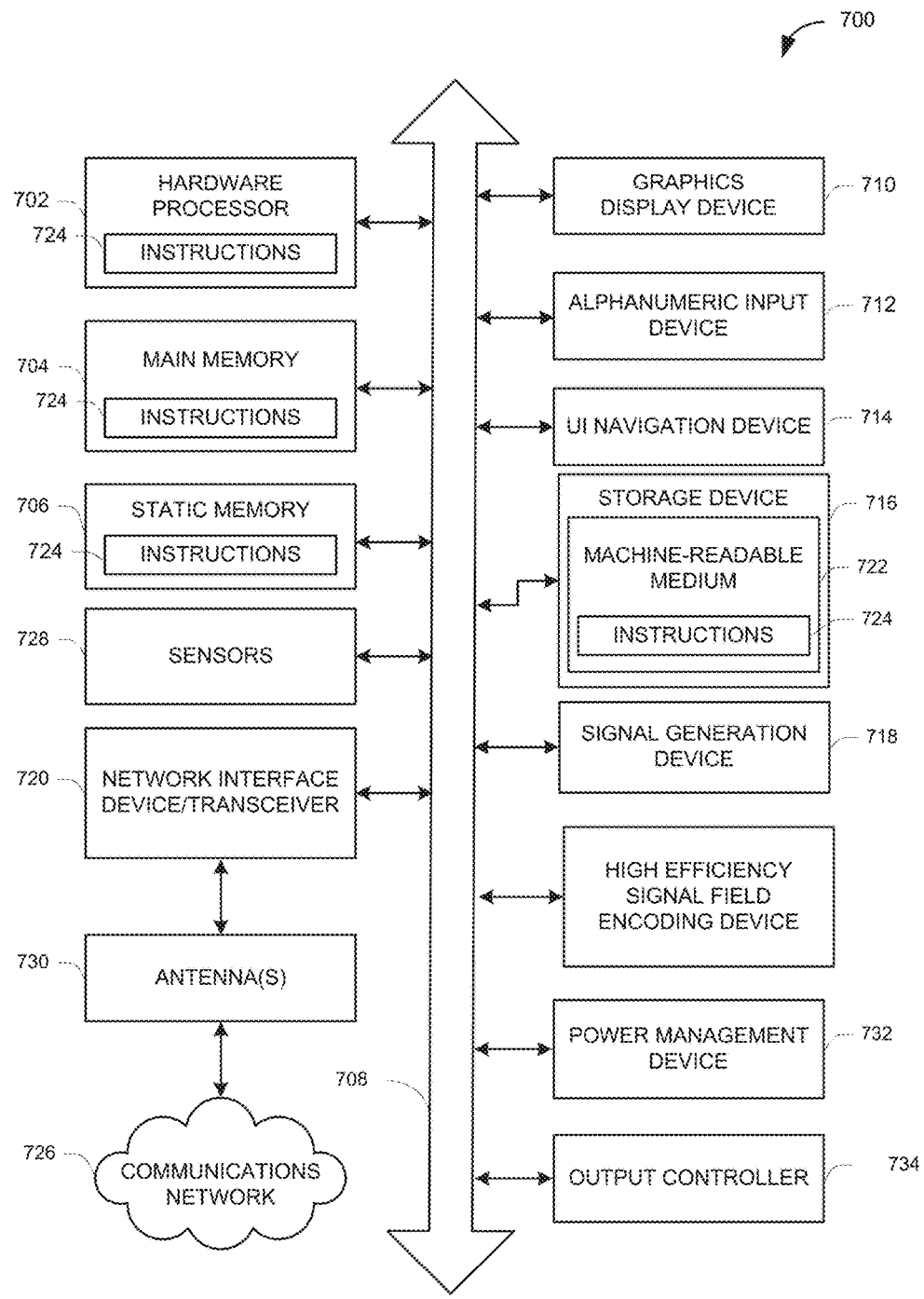
FIG. 7 is a block diagram of an example machine upon which any of one or more techniques (e.g., methods) may be performed, in accordance with one or more example embodiments of the disclosure.

FIG. 7 illustrates a block diagram of an example of a machine 700 or system upon which any one or more of the techniques (e.g., methodologies) discussed herein may be performed. In other embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environments. The machine 700 may be a personal computer (PC), a tablet PC, a set-top box (STB), a personal digital assistant (PDA), a mobile telephone, wearable computer device, a web appliance, a network router, switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating.

A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 700 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708. The machine 700 may further include a power management device 732, a graphics display device 710, an alphanumeric input device 712 (e.g., a keyboard), and a user interface (UI) navigation device 714 (e.g., a mouse). In an example, the graphics display device 710, alphanumeric input device 712, and UI navigation device 714 may be a touch screen display. The machine 700 may additionally include a storage device (i.e., drive unit) 716, a signal generation device 718 (e.g., a speaker), a high efficiency signal field parallel coding device 719, a network interface device/transceiver 720 coupled to antenna(s) 730, and one or more sensors 728, such as a global positioning system (GPS) sensor, compass, accelerometer, or other sensor. The machine 700 may include an output controller 734, such as a serial (e.g., universal serial bus (USB), parallel, or other wired or wireless (e.g., infrared (IR), near field communication (NFC), etc.) connection to communicate with or control one or more peripheral devices (e.g., a printer, card reader, etc.)).

The storage device 716 may include a machine readable medium 722 on which is stored one or more sets of data structures or instructions 724 (e.g., software) embodying or utilized by any one or more of the techniques or functions described herein. The instructions 724 may also reside, completely or at least partially, within the main memory 704, within the static memory 706, or within the hardware processor 702 during execution thereof by the machine 700. In an example, one or any combination of the hardware processor 702, the main memory 704, the static memory 706, or the storage device 716 may constitute machine-readable media.

The high efficiency signal field parallel coding device 719 may be configured to determine a communication channel between the device and a first device. The high efficiency signal field parallel coding device 719 may be configured to determine one or more subchannels of the communication channel. The high efficiency signal field parallel coding device 719 may be configured to determine a first high efficiency signal field and a second high efficiency signal field included in a high efficiency frame to be sent on the communication channel. The high efficiency signal field parallel coding device 719 may be configured to encode the second high efficiency signal field into one or more groups based at least in part on the one or more subchannels. It is understood that the above are only a subset of what the high efficiency signal field parallel coding device 719 may be configured to perform and that other functions included throughout this disclosure may also be performed by the high efficiency signal field parallel coding device 719.

While the machine-readable medium 722 is illustrated as a single medium, the term "machine-readable medium" may include a single medium or multiple media (e.g., a centralized or distributed database, and/or associated caches and servers) configured to store the one or more instructions 724.

The term "machine-readable medium" may include any medium that is capable of storing, encoding, or carrying instructions for execution by the machine 700 and that cause the machine 700 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., Electrically Programmable Read-Only Memory (EPROM), or Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device/transceiver 720 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), Plain Old Telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 720 may include one or more physical jacks (e.g., Ethernet, coaxial, or phone jacks) or one or more antennas to connect to the communications network 726. In an example, the network interface device/transceiver 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 700 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

According to example embodiments of the disclosure, there may be a device. The device may include a least one memory that stores computer-executable instructions, and at least one processor configured to access the at least one memory, wherein the least one processor is configured to execute the computer-executable instructions to: determine a frame to be sent; determine two or more receiving devices; determine one or more identifiers associated with the two or more receiving devices; generate the frame, the frame including the one or more identifiers in an address field of the frame; cause to transmit the frame to the two or more receiving devices.

Implementation may include one or more of the following features. The two or more receiving devices of the device may be multiple user multiple-input and multiple-output (MU-MIMO) compatible. The address field of the device may comprise one of a receiving address (RA) field or a transmitter address (TA) field wherein the transmitter address may be in the RA field and the receiving address may be in the TA field. The one or more identifiers may comprise: a hash of a portion of the media access control (MAC) addresses of the one or more identifiers; an associated identifier (AID). The generation of a frame by the device may comprise concatenating the one or more identifiers. The device may comprise a transceiver configured to transmit and receive wireless signals and may further comprise an antenna coupled to the transceiver.

According to example embodiments of the disclosure, there may be a non-transitory computer-readable medium storing computer-executable instructions which, when executed by a processor, cause the processor to perform operations comprising: determining a frame to be sent; determining two or more receiving devices; determining one or more identifiers associated with the two or more receiving devices; generating the frame, the frame including the one or more identifiers in an address field of the frame; causing to transmit the frame to the two or more receiving devices.

Implementation may include one or more of the following features. The two or more receiving devices of the non-transitory computer-readable medium may be multiple user multiple-input and multiple-output (MU-MIMO) compatible. The address field of the medium may comprise one of a receiving address (RA) field or a transmitter address (TA) field wherein the transmitter address may be in the RA field and the receiving address may be in the TA field. The one or more identifiers may comprise: a hash of a portion of the media access control (MAC) addresses of the one or more identifiers; an associated identifier (AID). The generation of a frame by the medium may comprise concatenating the one or more identifiers According to example embodiments of the disclosure, there may be a method comprising: determining a frame to be sent; determining two or more receiving devices; determining one or more identifiers associated with the two or more receiving devices; generating the frame, the frame including the one or more identifiers in an address field of the frame; causing to transmit the frame to the two or more receiving devices.

Implementation may include one or more of the following features. The two or more receiving devices of the method may be multiple user multiple-input and multiple-output (MU-MIMO) compatible. The address field of the method may comprise one of a receiving address (RA) field or a transmitter address (TA) field wherein the transmitter address may be in the RA field and the receiving address may be in the TA field. The one or more identifiers may comprise: a hash of a portion of the media access control (MAC) addresses of the one or more identifiers; an associated identifier (AID). The generation of a frame by the method may comprise concatenating the one or more identifiers.

According to example embodiments of the disclosure, there may be an apparatus comprising: means for determining a frame to be sent; means for determining two or more receiving devices; means for determining one or more identifiers associated with the two or more receiving devices; means for generating the frame, the frame including the one or more identifiers in an address field of the frame; means for causing to transmit the frame to the two or more receiving devices.

Implementation may include one or more of the following features. The two or more receiving devices of the apparatus may be multiple user multiple-input and multiple-output (MU-MIMO) compatible. The address field of the apparatus may comprise one of a receiving address (RA) field or a transmitter address (TA) field wherein the transmitter address may be in the RA field and the receiving address may be in the TA field. The one or more identifiers may comprise: a hash of a portion of the media access control (MAC) addresses of the one or more identifiers; an associated identifier (AID). The means for generation of a frame by the apparatus may comprise concatenating the one or more identifiers.

The word "exemplary" is used herein to mean "serving as an example, instance, or illustration." Any embodiment described herein as "exemplary" is not necessarily to be construed as preferred or advantageous over other embodiments. The terms "computing device", "user device", "communication station", "station", "handheld device", "mobile device", "wireless device" and "user equipment" (UE) as used herein refers to a wireless communication device such as a cellular telephone, smartphone, tablet, netbook, wireless terminal, laptop computer, a femtocell, High Data Rate (HDR) subscriber station, access point, printer, point of sale device, access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as 'communicating', when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

The term "access point" (AP) as used herein may be a fixed station. An access point may also be referred to as an access node, a base station, or some other similar terminology known in the art. An access terminal may also be called a mobile station, user equipment (UE), a wireless communication device, or some other similar terminology known in the art. Embodiments disclosed herein generally pertain to wireless networks. Some embodiments can relate to wireless networks that operate in accordance with one of the IEEE 802.11 standards.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems following one or more wireless communication protocols, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems, and/or networks.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device, comprising:
   at least one memory that stores computer-executable instructions; and
   at least one processor of the one or more processors configured to access the at least one memory, wherein the at least one processor of the one or more processors is configured to execute the computer-executable instructions to:
   determine a frame to be sent;
   determine two or more receiving devices;
   determine identifiers associated with the two or more receiving devices;
   concatenate the identifiers;
   generate the frame, the frame including the concatenated identifiers in a transmitter address (TA) field; and
   cause to transmit the frame to the two or more receiving devices.

2. The device of claim 1, wherein the two or more receiving devices are multiple user multiple-input and multiple-output (MU-MIMO) compatible.

3. The device of claim 1, wherein a transmitter address is in a receiving address (RA) field.

4. The device of claim 2, wherein the identifiers comprise a group identifier associated with the two or more receiving devices.

5. The device of claim 2, wherein the identifiers comprise a hash of a portion of media access control (MAC) addresses of the identifiers.

6. The device of claim 2, wherein the identifiers comprise an associated identifier (AID).

7. The device of claim 1, further comprising a transceiver configured to transmit and receive wireless signals.

8. The device of claim 7, further comprising an antenna coupled to the transceiver.

9. A non-transitory computer-readable medium storing computer-executable instructions which, when executed by a processor, cause the processor to perform operations comprising:
   determining a frame to be sent;
   determining two or more receiving devices;
   determining identifiers associated with the two or more receiving devices;
   concatenating the identifiers;
   generating the frame, the frame including the concatenated identifiers in a transmitter address (TA) field; and
   causing to transmit the frame to the two or more receiving devices.

10. The non-transitory computer-readable medium of claim 9, wherein the two or more receiving devices are MU-MIMO compatible.

11. The non-transitory computer-readable medium of claim 9, wherein a transmitter address is in a receiving address (RA) field.

12. The non-transitory computer-readable medium of claim 10, wherein the identifiers comprise a group identifier associated with the two or more receiving devices.

13. The non-transitory computer-readable medium of claim 10, wherein the identifiers comprise a hash of a portion of a media access control (MAC) addresses of the identifiers.

14. The non-transitory computer-readable medium of claim 10, wherein the identifiers comprise an associated identifier (AID).

15. A method comprising:
   determining a frame to be sent;
   determining two or more receiving devices;
   determining identifiers associated with the two or more receiving devices;
   concatenating the identifiers;
   generating the frame, the frame including the concatenated identifiers in a transmitter address (TA) field; and
   sending the frame to the two or more receiving devices.

16. The method of claim 15, wherein the two or more receiving devices are MU-MIMO compatible.

17. The method of claim 15, wherein a transmitter address is placed in a receiving address (RA) field.

18. The method of claim 16, wherein the identifiers comprises a group identifier associated with the two or more receiving devices.

19. The method of claim 16, wherein the identifiers comprises a hash of a portion of a media access control (MAC) addresses of the identifiers.

20. The method of claim 16, wherein the identifiers comprise an associated identifier (AID).

* * * * *